United States Patent
Herrera

(10) Patent No.: US 9,415,822 B2
(45) Date of Patent: Aug. 16, 2016

(54) PROTECTIVE AND DECORATIVE SHELL FOR MOTORCYCLE HORN COVERS

(71) Applicant: Benjamin N. Herrera, Albuquerque, NM (US)

(72) Inventor: Benjamin N. Herrera, Albuquerque, NM (US)

(*) Notice: Subject to any disclaimer, the term of this patent is extended or adjusted under 35 U.S.C. 154(b) by 47 days.

(21) Appl. No.: 14/258,330

(22) Filed: Apr. 22, 2014

(65) Prior Publication Data

US 2015/0298755 A1   Oct. 22, 2015

(51) Int. Cl.
*B60J 11/06* (2006.01)
*B62J 23/00* (2006.01)

(52) U.S. Cl.
CPC ........................................ *B62J 23/00* (2013.01)

(58) Field of Classification Search
CPC .............. B62J 23/00; B62J 2300/0026; B62J 2300/0033; B62K 19/48; B60J 11/00; B60J 11/06
USPC ............ 280/762, 770, 847, 848, 159; 116/59, 116/60, 137 R, 138, 139, 142 R; D12/114, D12/117, 126
See application file for complete search history.

(56) References Cited

U.S. PATENT DOCUMENTS

| | | | | |
|---|---|---|---|---|
| D294,922 S | * | 3/1988 | Nagy | D12/126 |
| 5,703,335 A | * | 12/1997 | Deutsch | 181/150 |
| 6,294,984 B1 | * | 9/2001 | Meister | 340/404.1 |
| 8,261,685 B2 | * | 9/2012 | Nishimoto et al. | 116/59 |
| 8,517,426 B2 | * | 8/2013 | McMillan | 280/848 |

FOREIGN PATENT DOCUMENTS

JP    2012163880 A  *  8/2012

\* cited by examiner

*Primary Examiner* — John Walters
(74) *Attorney, Agent, or Firm* — Alberto A. Leó; ALeónLaw, P.C.

(57) ABSTRACT

A protective and decorative shell that securely fits onto and covers motorcycle horn covers is disclosed and claimed. The shell of the present invention can be manufactured using thermoplastic or thermo-softening plastic, allowing for molding and pliability above specific temperatures, resulting in a resistant shell upon cooling. The device of the invention can be fabricated in a variety of shapes and thicknesses, thus allowing control of the resulting weight. Another advantage of the chosen materials is the ability to paint, print, etch or cut numerous designs, logos or other decorative symbols on the exposed shell. The shell is shaped to match the shape of a prior art motorcycle horn cover and snaps or screws into place over the horn cover. The shell has an opening that matches the placement of the opening on the horn cover so that the horn's sound is not muffled.

7 Claims, 7 Drawing Sheets

PROTECTIVE AND DECORATIVE SHELL FOR MOTORCYCLE HORN COVERS

STATEMENT REGARDING FEDERALLY SPONSORED RESEARCH AND DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

CROSS-REFERENCE TO RELATED APPLICATION

Not applicable

BACKGROUND OF THE INVENTION

1. Field of the Invention

The present invention relates to motorcycle horn covers. More particularly, the present invention relates to a protective and decorative pre-molded shell adaptable onto and conforming to motorcycle horn covers.

2. Description of the Related Art Including Information Disclosed Under 37 CFR 1.97

The following description of the art related to the present invention refers to a number of publications and references. Discussion of such publications herein is given to provide a more complete background of the principles related to the present invention and is not to be construed as an admission that such publications are necessarily prior art for patentability determination purposes.

Most modern motorcycles comprise a horn(s) placed in a visible and readily accessible part of the motorcycle. It has become very fashionable for factory horns to be adapted with a decorative cover featuring shapes, names, symbols, logos and other structures visually appealing or significant to motorcycling aficionados. A recent internet search revealed hundreds of motorcycle horn covers available for sale, including numerous shapes and sizes and showcasing numerous symbols, logos and other decorative themes.

A search of the USPTO database revealed at least two design patents covering motorcycle horn covers. U.S. D626,894 to Holcomb and U.S. Des 294,922 to Nagy, both disclose and claim the ornamental features of two different motorcycle horn covers. The main idea behind of the motorcycle horn covers, which ornamental features are disclosed and claimed in those patents, based on other "horn guard" devices available (like U.S. Pat. No. 8,261,685 to Nishimoto et al.), appear to be the protection of the horn from weather and other external forces.

Based on the drawings included in the motorcycle horn cover patents, the motorcycle horn covers appear to be largely made of metal. Those devices basically fit securely over the motorcycle horn and comprise an aperture(s) placed in such a manner that the device allows both protection of the horn and projection of the horn's sound. Because motorcycle horns and covers are exposed, the cover is subject to being scratched or to accumulating dirt or other road residues. Further, for the most part, the combination of those two devices provides an exposed shell of the motorcycle that can be used to add decorative or identifying features to the motorcycle.

SUMMARY OF THE INVENTION

Objects, advantages and novel features, and further scope of applicability of the present invention will be set forth in part in the detailed description to follow, taken in conjunction with the accompanying drawings. The objects, advantages and novel features, and further scope of applicability of the present invention will become apparent to those skilled in the art upon examination of the following, or may be learned by practice of the invention. The objects and advantages of the invention may be realized and attained by means of the instrumentalities and combinations particularly pointed out in the appended claims.

It is an object of the invention disclosed and claimed herein to provide a unitary, protective and decorative pre-molded shell firmly adaptable onto motorcycle horn covers comprising a combination of structural and functional elements that allows the protection of the horn cover from the elements.

It is another object of the invention disclosed and claimed herein to provide a unitary, protective and decorative pre-molded shell firmly adaptable and conforming onto motorcycle horn covers comprising a combination of structural and functional elements that allows affixing, printing, etching and cutting decorative elements onto the motorcycle horn cover and unitary shell combination.

It is a further object of the invention disclosed and claimed herein to provide a multi-part protective and decorative pre-molded shell firmly adaptable and conforming onto motorcycle horn covers comprising a combination of structural and functional elements that incorporate all the decorative and protective functionalities described above and comprise interchangeable top areas so the same shell/horn cover combination can be adapted with different decorative and protective top areas.

The invention disclosed herein integrates an easy-to-manufacture, user friendly, easily adaptable and decoratively appealing shell capable of being securely and firmly fitted over most standard motorcycle horn covers. The preferred embodiment of the invention is a unitary, monolithic device capable of being manufactured using a single mold. Another embodiment of the invention comprises a multi-part device capable of receiving multiple top areas so the decorative aspect of it can be modified without dislodging or repositioning the full device.

BRIEF DESCRIPTION OF THE DRAWINGS

The accompanying drawings, which are incorporated into and form a part of the specification, illustrate an embodiment of the present invention and, together with the description, serve to explain the principles of the invention. The drawings are only for the purpose of illustrating a preferred embodiment of the invention and are not to be construed as limiting the invention.

DETAILED DESCRIPTION OF THE INVENTION

Figure 1:
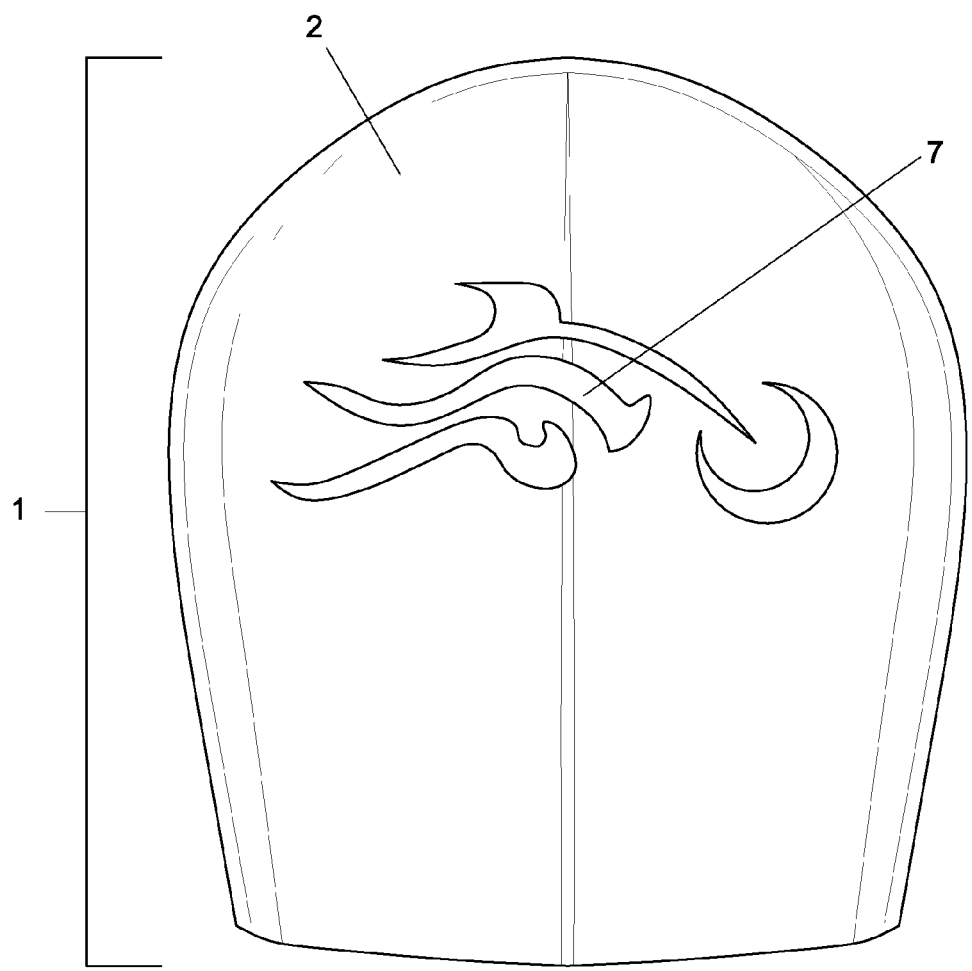
FIG. 1 is a top view of the protective and decorative shell of the invention, including a decorative element for the preferred embodiment.
Figure 2:
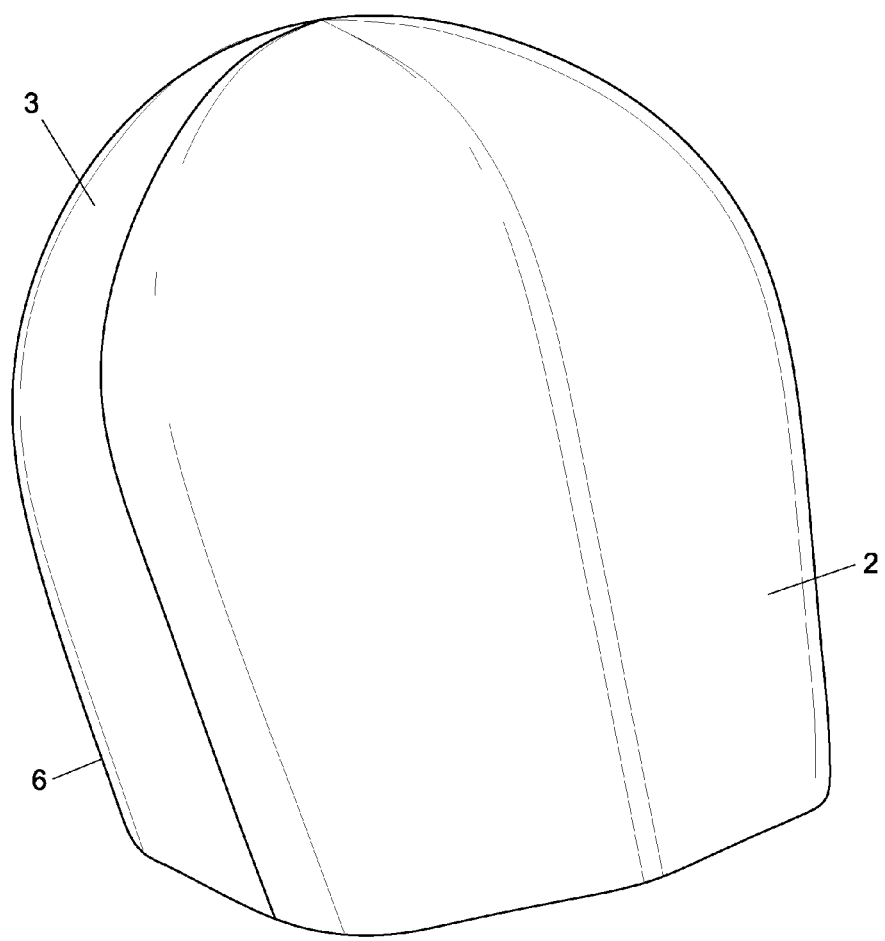
FIG. 2 is a perspective view of the invention.
Figure 3:
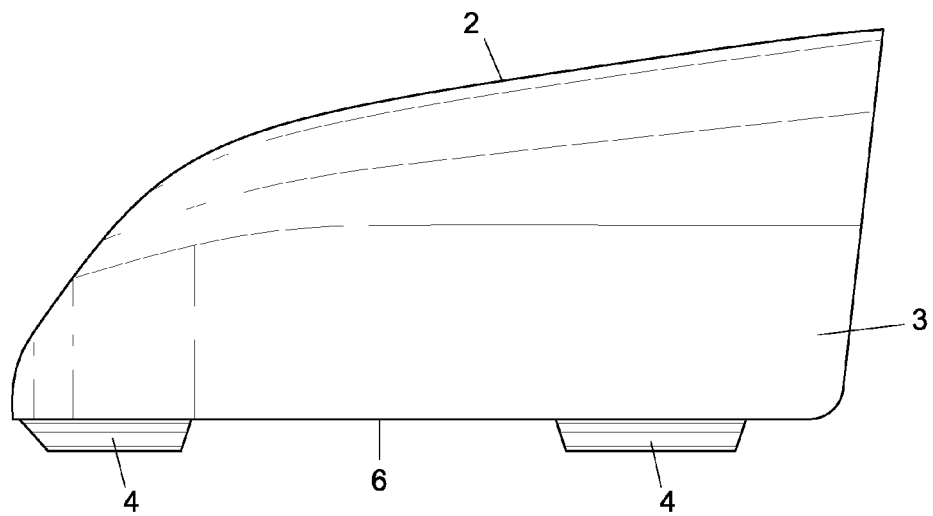
FIG. 3 is an elevational side view of the invention.
Figure 4:
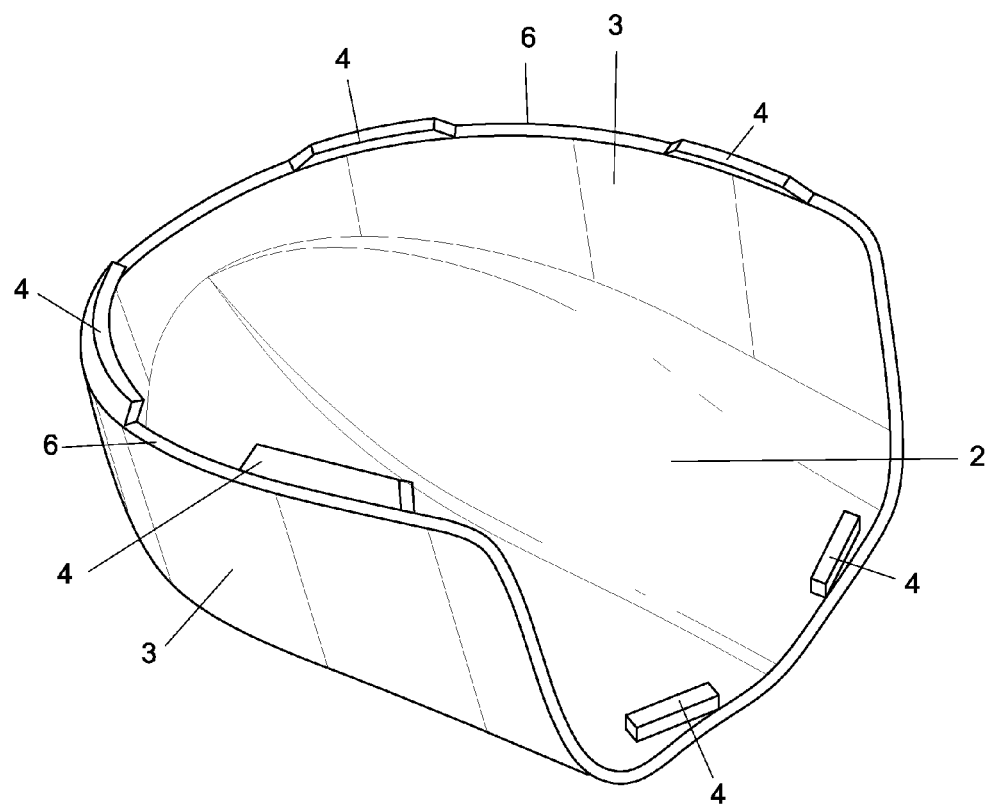
FIG. 4 is a perspective view of the bottom side of the invention.

The present invention is a protective and decorative pre-molded shell (1) adaptable onto prior art motorcycle horn covers (11). The shell can be manufactured using thermoplastic or thermo-softening plastic. The use of those polymeric materials allows for molding and pliability above specific temperatures, resulting in a resistant shell upon cooling. The device of the invention can be fabricated in a variety of shapes and thicknesses, thus allowing control of the resulting weight. The polymeric materials can be selected from a wide variety of colors, blends of colors and opacities. Another advantage of the chosen materials is the ability to paint, print, etch or cut numerous designs, logos or other decorative symbols (7) onto or into the exposed shell (1), as illustrated in FIG. 1.

The protective and decorative pre-molded shell adaptable onto motorcycle horn covers of the present invention has two primary embodiments. In both embodiments, the shape of the pre-molded shell (1) essentially matches the shape of the motorcycle horn cover (11). The shell is slightly larger in dimension than the horn cover in order to fit over the cover. The description of the embodiments below assumes the currently standard horseshoe-shaped horn cover. However, the shape of the shell of the invention can be varied to adapt to any shape of motorcycle horn cover on the market. The shell of the invention covers the outward-facing surfaces of the motorcycle horn cover, i.e., those that are readily visible. As with prior art horn covers, at least one portion of the circumference of the shell is open in order to allow the sound of the motorcycle horn to project.

The preferred embodiment of the invention comprises monolithic, unitary shell (1) comprising top wall (2), an outward side wall (3) and attaching means (4) extending from the side wall (3) inwardly about its periphery. The side wall (3) comprises a gap (5) in its span around the top wall (2) that corresponds to the gap in the motorcycle horn cover for which it is designed. The preferred embodiment's attachment means (4) is capable of firmly engaging into most standard motorcycle horn covers (11) by being snapped in place over the horn cover thus allowing the attaching means (4) to grab the edges and side of the horn cover. In the preferred embodiment, the back of the shell is open, and the attachment means (4) are protrusions from the side wall inward towards the center of the shell.

In the preferred embodiment, the top wall (2) is bell-shaped and the side wall (3) is "u"-shaped. The side wall (3) depends from the top wall (2) and terminates in a bottom edge (6) because the bottom of the shell is open. The top wall (2) fills in the interior of the "u"-shape (3), including the open span or gap (5) in the side wall (3). The attachment means (4) protrude from the bottom edge (6) of the side wall (3) into the open bottom of the shell in order to enfold the corresponding side wall of a motorcycle horn cover (11).

Figure 5:
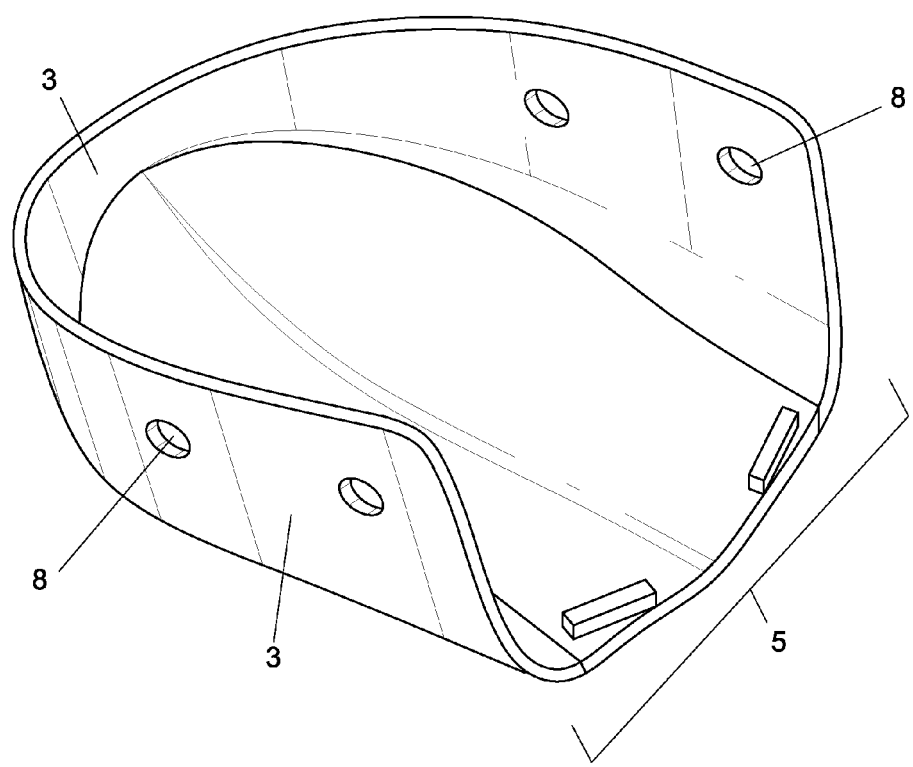
FIG. 5 is perspective view of the bottom side of the invention showing the alternative engaging means.

In an alternative embodiment of the invention, as shown in FIG. 5, the attaching means (4) comprises multiple perforations or openings (8) in the side wall (3) surface capable of receiving a screw or a similar securing means, thus requiring corresponding perforations or holes (12) on the surface of the horn cover (11) that acts as a receiving means. The holes or perforations on the horn cover and the shell of the invention can be aligned, and a screw or similar fastening device can be used to attach the shell (1) to the horn cover (11).

Figure 6:
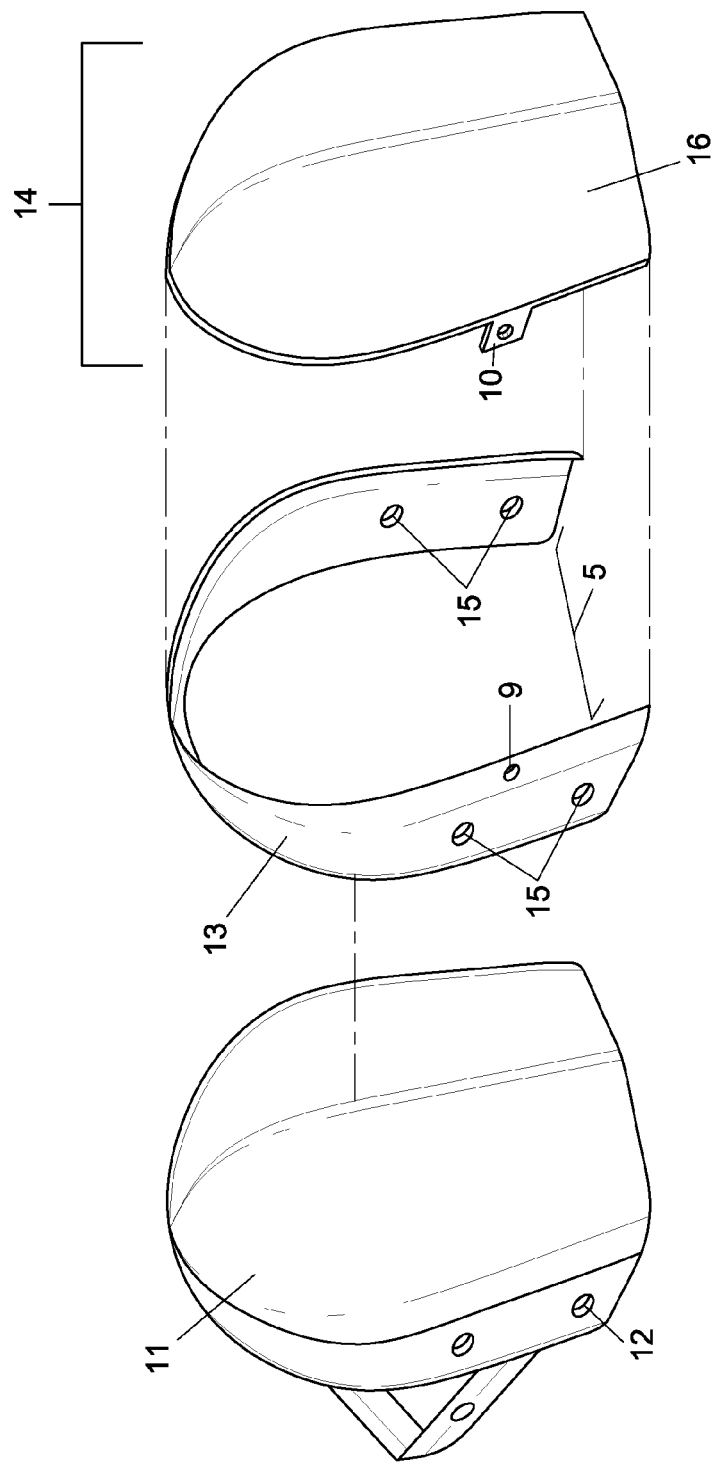
FIG. 6 is an exploded view of a multi-part alternative embodiment of the invention, including a motorcycle horn cover.

The second major alternative embodiment of the invention shown in FIG. 6 and comprises a multi-part shell. The shell comprises an insert component (14), which roughly corresponds to the top wall (2) of the preferred embodiment, and a base component (13), which corresponds to the side wall (3) of the preferred embodiment. The insert (14) comprises a top surface (16) and an engaging means (10) that depends from the top surface (16) and is capable of firmly engaging the insert to the base component. As in the preferred embodiment, the base component comprises attachment means (15) to firmly attach it to a horn cover (11) of similar shape. The base component (13) also comprises receiving means (9) capable of firmly engaging the insert's engaging means (10) thus resulting in an arrangement whereupon the insert (14) becomes interchangeable with other inserts and the same device can be fitted with a different inserts (14) without removing the shell's base component (13) from the horn cover (11).

Figure 7:
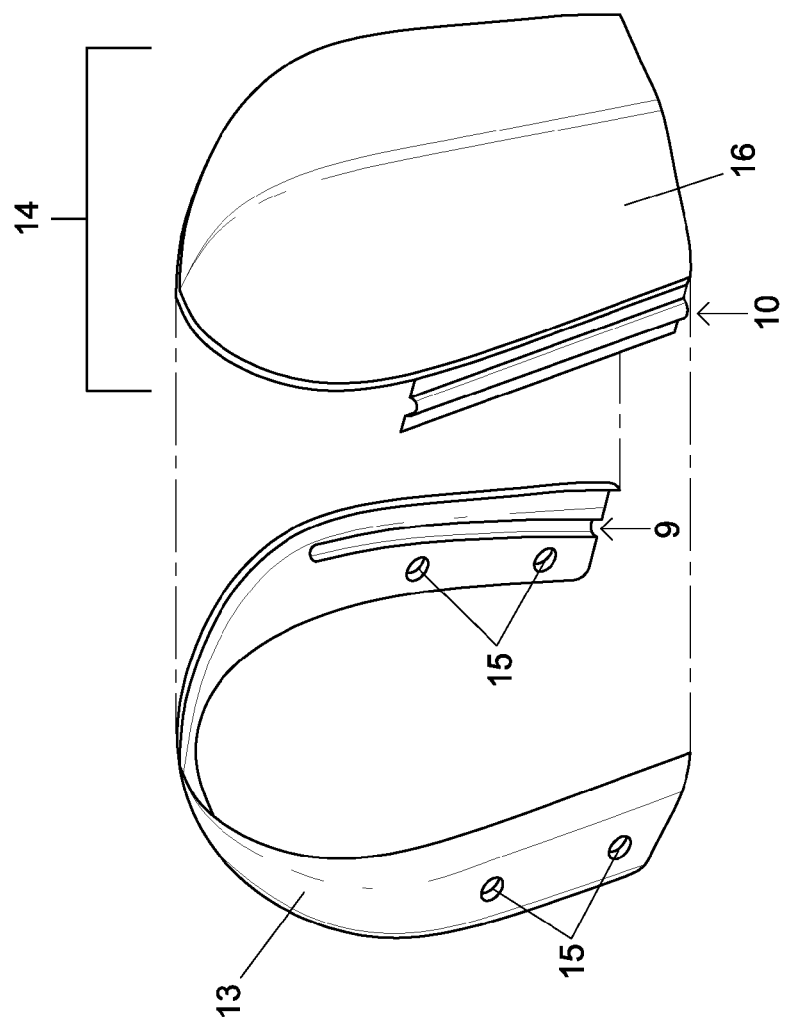
FIG. 7 is an exploded view of another multi-part alternative embodiment of the invention.

The base component's attachment means (15) are the same as the preferred embodiment's attachment means (4). The base component's receiving means (9) and the insert's engaging means have two primary embodiments that allow for a stable attachment between the two pieces that can withstand the vibration of a motorcycle. In the first embodiment, the engaging means (10) and the receiving means (9) comprise a slideable arrangement wherein the receiving means is two channels on the two outer sides of the base component starting at the open bottom (5) and extending to the top of the base component, as pictured in FIG. 7. The insert component's engaging means (10) comprises protrusions on either side of the insert (14) that match the cross-sections of the channels in the base component. The protrusion is sized to slide into the channel and firmly engage the base component (13).

The second embodiment of the engaging means (10) and receiving means (9) pairing comprises corresponding holes on both sides of the base component (13) and the insert (14), as illustrated in FIG. 6. When the holes are lined up, a fastening device, such as a screw can be inserted through both holes to secure the devices together. In yet another embodiment, the receiving means (9) comprises holes on both sides of the base component (13), and the engaging means (10) comprises protrusions that extend through the holes on the base component and secure the two pieces together.

What is claimed is:

1. A protective and decorative shell adaptable and conforming onto a motorcycle horn covers comprising:
    a. a top wall comprising an outer periphery;
    b. an outward side wall depending from the top wall outwardly about the top wall's periphery and terminating in a bottom edge, the outward side wall further comprising a gap and
    c. an attaching means for engaging the shell to a motorcycle horn cover.

2. A protective and decorative shell adaptable and conforming onto a motorcycle horn covers according to claim 1 wherein the attaching means comprises multiple protrusions extending from the bottom edge of the outward sidewall, the protrusions being angled inwardly in such a way that they engage a corresponding bottom edge of a motorcycle horn cover.

3. A protective and decorative shell adaptable and conforming onto a motorcycle horn covers according to claim 1 wherein the attaching means comprises multiple screws thus requiring perforations on the adjacent surface of a horn cover that act as receiving means thus allowing the shell to be engaged to a motorcycle horn cover.

4. A protective and decorative shell adaptable and conforming onto a motorcycle horn covers comprising an insert and a base component, wherein the insert comprises a top wall and an engaging means depending from the top wall, wherein the engaging means engages the base component, and the base component encloses a motorcycle horn cover's outer perimeter, and the base wall comprises a receiving means and an engaging means, wherein the receiving means receives the insert's engaging means and the attaching means attaches to a motorcycle horn cover.

5. A protective and decorative shell adaptable and conforming onto a motorcycle horn covers according to claim 4, wherein the base component's receiving means is selected from a group comprising a receiving channel that slideably receives the insert's engaging means, and holes that correspond to the insert's engaging means.

6. A protective and decorative shell adaptable and conforming onto a motorcycle horn covers according to claim 4, wherein the base component's attaching means is selected from a group comprising holes, and protrusions extending from a bottom edge of the base component, the protrusions being angled inwardly in such a way that they engage a corresponding bottom edge of a motorcycle horn cover.

7. A protective and decorative shell adaptable and conforming onto a motorcycle horn covers according to claim 4, wherein the insert's engaging means is selected from a group comprising holes that correspond to holes on the base component, protrusions that engage holes on the base component, and protrusions that correspond to the shape of the base component's receiving channel and that slide into the base component's receiving channel.

\* \* \* \* \*